(No Model.)
G. FINLEY.
BICYCLE SUPPORT.
No. 499,457. Patented June 13, 1893.
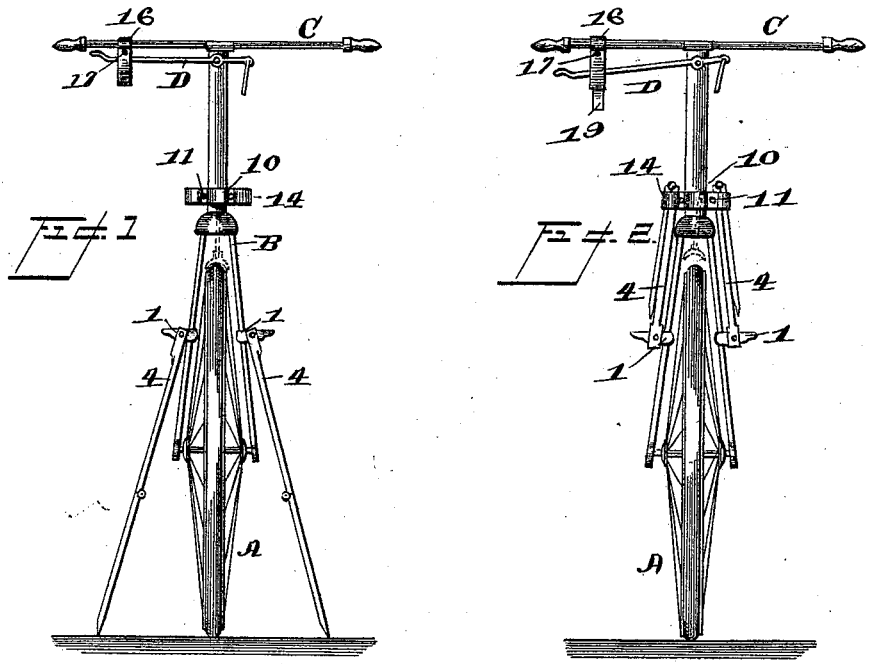
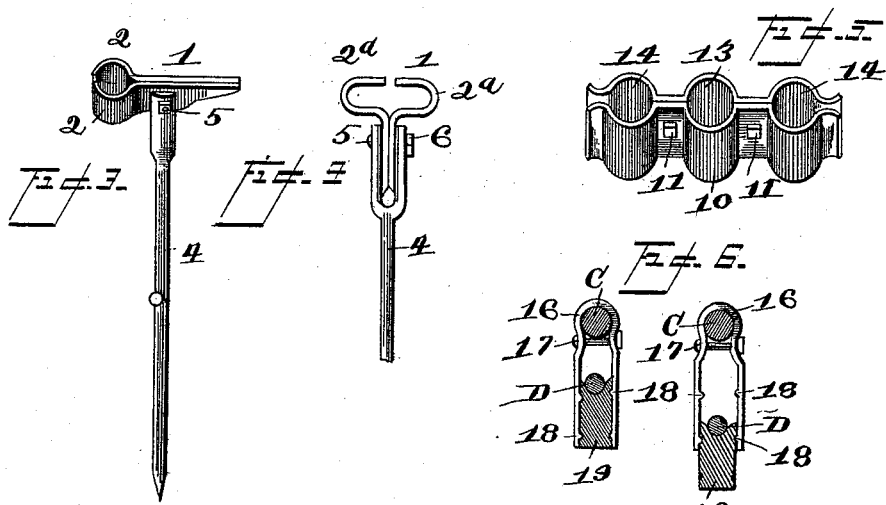
WITNESSES:
INVENTOR.
Gipson Finley
BY
ATTORNEY.

UNITED STATES PATENT OFFICE.

GIPSON FINLEY, OF GRAND RIDGE, ILLINOIS.

BICYCLE-SUPPORT.

SPECIFICATION forming part of Letters Patent No. 499,457, dated June 13, 1893.

Application filed December 12, 1892. Serial No. 454,844. (No model.)

*To all whom it may concern:*

Be it known that I, GIPSON FINLEY, residing at Grand Ridge, in the county of La Salle and State of Illinois, have invented certain new and useful Improvements in Bicycle-Supports, of which the following is a specification, reference being had therein to the accompanying drawings.

This invention relates to supports for bicycles and similar machines.

The object of the invention is to produce a supporting attachment or attachments by which a bicycle may be held in upright position while at rest, which attachment shall be readily attachable and occupy but little space. Also to have a co-operating brake attachment, to hold the brake in contact and prevent the wheel from turning when the support is in operation. Also in the construction of the parts constituting the support and brake fastening.

Figure 1 is a front view of so much of a bicycle as is needed to show the support and attachments connected thereto; in operative position. Fig. 2 is a similar view showing support folded up for transportation. Fig. 3 is a perspective view of one of the supporting legs, foot rest and clasp. Fig. 4 is a plan, partly broken away, of a modified construction of same. Fig. 5 is a perspective of retaining clasp. Fig. 6 is a cross section of brake holding catch in two positions.

The wheel A, fork B, and handle bar C of the cycle are of any suitable or usual construction.

The clasp 1 consists preferably of thin plates of metal, having the ends bent to such form as to readily embrace one prong of the fork B of the cycle. In Fig. 3 the clasp is shown of convenient form to embrace a round fork bar, and in Fig. 4 the clasp is shown of shape to embrace a flat or oval fork bar. The plates 2 or 2ª constituting the clasp are preferably prolonged to form the foot rest.

The supporting leg 4 is jointed, and may be slotted or forked at the end, as in Fig. 4, to straddle the foot rest, or it may be a straight piece, having an eye. The bolt 5 passes through the eye in the leg, and through the plates of the clasp. When the nut 6 on this bolt is screwed up, as in Figs. 1 and 2, the plates constituting the clasp are brought tightly around the bar of the fork, and the clasp is held firmly thereto. The leg is also held to the clasp by the same bolt. Washers may be interposed where necessary. When the leg is attached to the clasp, and the clasp to the fork, the leg can be turned down to form a brace, as in Fig. 1, or may be folded up close to the fork, as in Fig. 2. The hinge joint in the leg permits this folding of the leg against the fork of the bicycle. When the legs at each side of the bicycle are turned down, as in Fig. 1, they brace and support the machine in upright position. When turned up, as in Fig. 2, the joints 7 are flexed, and the legs are then held by the spring clasps 10.

Clasp 10 consists of two plates, preferably of spring metal, which are clamped together by bolts 11. The central part of the plates forms a socket 13, which embraces the head or bar of the fork, and is firmly held thereto by tightening the nuts on bolts 11. The outer ends of the plates are bent to form a spring clasp 14 into which the doubled end of the supporting leg may be turned. The form of the clasp will be such as to readily embrace the supporting leg, and the outer ends of the plates are flared, so that the folded leg will be easily swung into or out of its clasp, but will be held against accidental escape by the clasp.

When the legs are turned down to support the wheel, if the wheel were allowed to turn an undue strain would be thrown on the legs, with a tendency to bend or break them. To prevent this, the brake should be fastened to hold the wheel from turning. The attachment for holding the brake consists of a clamp 16, which goes round the handle bar C and straddles the brake handle D. This clamp consists of a spring strap, having teeth as 18 on its inner surface. The strap is held to the handle bar by a bolt 17. A block 19 is held between the straight arms of the clamp strap by the teeth 18 entering notches in the sides of the block. When the brake is set and the legs turned down, the block 19 is pushed up in the clamp, as in Fig. 1, so as to retain the brake in its holding position. When it is not desired to hold the brake to its work, the block 19 may be slid down in its clamp, as in Fig. 2 when the brake will be no longer held.

Of course other manner of holding the block 19 between the arms of the clamp might be adopted, if the same general principle is retained.

A great advantage of my bicycle support is that it can be cheaply made, and can be readily attached to and detached from machines as usually made, without injury to the machines.

What I claim is—

1. The clasp consisting of plates of shape to embrace the fork of a bicycle, and having the ends projecting, (when so attached) to form a foot rest, the supporting leg connected to said foot rest, and the bolt for attaching said foot rest to the fork and the leg to the foot rest, all combined and relatively arranged substantially as described.

2. The combination with the fork of a bicycle of a foot rest consisting of plates embracing said fork, a jointed supporting leg pivoted to said foot rest, and a spring clasp on the bar or head of the fork by which said supporting leg may be held when turned up, all substantially as described.

3. The fork clasp and jointed leg attached to each prong of the fork of a bicycle, and the leg clasp consisting of two metallic plates having a central socket embracing the bar of the fork, and having the ends projecting and flaring to form spring clasps at each side of the fork bar, said plates attached together and to the fork bar by bolts at each side of said bar, all combined substantially as described.

4. In combination with the supporting legs, the brake clasp consisting of a spring strap forming a loop which embraces the handle bar, the bolt connecting said strap to the bar, and the block adjustably held between the ends of the spring strap, in position to bear on the brake handle, substantially as described.

In testimony whereof I affix my signature in presence of two witnesses.

GIPSON FINLEY.

Witnesses:
J. M. CORE,
W. M. JONES.